United States Patent
Hayami et al.

(10) Patent No.: US 7,468,012 B2
(45) Date of Patent: Dec. 23, 2008

(54) RATCHET TYPE TENSIONER

(75) Inventors: Atsushi Hayami, Osaka (JP); Toshifumi Sato, Osaka (JP)

(73) Assignee: Tsubakimoto Chain Co., Osaka (JP)

( * ) Notice: Subject to any disclaimer, the term of this patent is extended or adjusted under 35 U.S.C. 154(b) by 228 days.

(21) Appl. No.: 11/319,352

(22) Filed: Dec. 28, 2005

(65) Prior Publication Data
US 2006/0194661 A1   Aug. 31, 2006

(30) Foreign Application Priority Data
Feb. 25, 2005   (JP)   ............... 2005-050790

(51) Int. Cl.
F16H 7/08   (2006.01)
(52) U.S. Cl. .................................... 474/110
(58) Field of Classification Search ............... 474/101, 474/109, 110, 111, 119, 140; 74/575, 579 R
See application file for complete search history.

(56) References Cited

U.S. PATENT DOCUMENTS

| | | | |
|---|---|---|---|
| 3,211,021 A * | 10/1965 | Fish | 74/577 R |
| 5,030,169 A | 7/1991 | Kiso et al. | |
| 5,607,368 A | 3/1997 | Hida et al. | |
| 5,700,213 A | 12/1997 | Simpson et al. | |
| 6,059,678 A | 5/2000 | Suzuki | |
| 6,478,703 B2 * | 11/2002 | Suzuki | 474/101 |
| 7,077,772 B2 * | 7/2006 | Hashimoto et al. | 474/109 |
| 7,250,015 B2 * | 7/2007 | Yoshida | 474/110 |
| 2004/0127316 A1 | 7/2004 | Hashimoto et al. | |
| 2006/0270501 A1 * | 11/2006 | Maile et al. | 474/110 |

FOREIGN PATENT DOCUMENTS

| | | |
|---|---|---|
| EP | 1 227 264 A1 | 7/2002 |
| EP | 1 323 950 A1 | 7/2003 |
| EP | 1 441 150 A2 | 7/2004 |
| JP | 3-2951 | 5/1989 |
| JP | 08-044862 | 1/1996 |
| JP | 09-119490 | 5/1997 |
| JP | 11-344086 | 12/1999 |

* cited by examiner

Primary Examiner—Vicky A Johnson
(74) Attorney, Agent, or Firm—Howson & Howson LLP

(57) ABSTRACT

In a ratchet tensioner, a pawl, pivoted on a shaft in the tensioner housing, engages teeth on a plunger protruding from the housing to allow protruding movement of the plunger, while limiting retracting movement to a backlash distance. The pawl is biased into contact with the teeth on the plunger by a spring disposed in a hole in the housing and acting, through a piston slidable in the same hole, against a convexly curved surface of the pawl. The piston has a reduced portion in engagement with the pawl, which allows the pawl to be miniaturized without excessively reducing the radial dimensions of the portion of the pawl surrounding the pivot shaft.

2 Claims, 8 Drawing Sheets

RATCHET TYPE TENSIONER

CROSS-REFERENCE TO RELATED APPLICATIONS

This application claims priority on the basis of Japanese Patent Application 2005-050790, filed on Feb. 25, 2005. The disclosure of Japanese Patent Application 2005-050790 is hereby incorporated by reference.

FIELD OF THE INVENTION

The invention relates to improvements in a ratchet tensioner used for applying proper tension to a flexible, endless, traveling, transmission medium such as the timing chain, timing belt, or the like, in the internal combustion engine of a vehicle.

BACKGROUND OF THE INVENTION

In timing transmissions of the kind in which a chain is used to transmits power from a crankshaft to one or more camshafts of an engine, ratchet tensioners have been widely used for maintaining proper tension in the slack side of the timing chain. The tensioner typically presses against a pivoted tensioner lever, on which the chain slides, and the pivoted lever, in turn, presses against the chain, suppressing vibration.

A conventional ratchet type tensioner 500, as shown in FIGS. 6-8, comprises a hollow plunger 520, slidable in a plunger-accommodating hole 511 of a tensioner housing 510. The plunger protrudes from the housing, and is spring-biased in the protruding direction. Oil is introduced under pressure into a high pressure oil chamber formed by the housing and the hollow plunger through a check valve. Excessive tension in the transmission chain causes a force to be applied to the plunger, urging the plunger in the retracting direction. The force is absorbed by the flow of oil though the small clearance between the exterior of the plunger and the cylindrical wall of the plunger-accommodating hole in the housing.

Rack teeth 522 are formed on the exterior of the plunger, and cooperate with a pawl 540, which is pivotally mounted about a shaft 512 on the housing. The pawl has teeth 541 and 542, which are engageable with the rack teeth on the plunger, and is biased, by a spring 550, so that it rotates about shaft 512 in a direction such that its teeth are urged into engagement with the rack teeth on the plunger. The ratchet mechanism allows protruding displacement of the plunger 520, but limits retracting movement to a distance corresponding to the backlash of the ratchet mechanism. Thus, in the operation of the tensioner, if excessive tension occurs in the chain, the plunger will be pushed in its retracting direction through a distance limited by the ratchet backlash, and the force applied to the plunger is absorbed by leakage of oil through the clearance between the plunger and the wall of the plunger-accommodating hole. As the chain elongates over time, due to mechanical wear, the ratchet allows the plunger to protrude, thereby taking up the slack resulting from elongation of the chain, and maintaining proper chain tension over a long time. A typical ratchet tensioner of the type described above, and shown in FIGS. 6-9, is described more fully in U.S. Pat. No. 6,059,678, the disclosure of which is also hereby incorporated by reference.

In the conventional ratchet tensioner 500, as shown in FIG. 7, the ratchet-biasing spring 550 is accommodated in a hole 513 formed in the housing, and protrudes toward the pawl, directly engaging the pawl 540, and biasing the pawl so that its teeth are brought into contact with the rack teeth on the plunger. Where an engine is designed for high load, or high speed operation, the plunger is required to have a relatively large stroke, and the pitch of the rack teeth is correspondingly large. A consequence of the larger stroke requirement in the case of an engine designed for high load or high speed operation, is that the space between the opening of the hole 513 and the pawl must be made larger in order to provide room for expansion and contraction of the pawl-biasing spring 550. However, if the spacing between the opening of hole 513 and the pawl 540 is made too large in relation to the length of the spring 550, it is possible for the spring 550 to drop out of the spring-accommodating hole 513, as depicted in FIG. 7.

On the other hand, even if the plunger-biasing spring 550 is made sufficiently long to prevent it from dropping out of hole 513, the protruding portion of the spring can buckle or become entangled within the space X between the opening of hole 513 and the pawl 540, as shown in FIG. 8. Repeatedly buckling of the spring compromises its elasticity, and can result in failure of the ratchet mechanism.

Furthermore, since in the conventional ratchet tensioner 500, the ratchet-biasing spring 550 contacts the pawl 540 directly, the spring-contacting surface of the pawl should be flat, and should be of size corresponding to the spring diameter. Moreover, it is necessary to ensure that the radial dimensions of the parts of the pawl in the vicinity of its pivoting shaft do not become so small as to weaken the pawl excessively. As a result, the spring imposes minimum size requirements both on the width of the pawl, and on the length of the portion of the pawl contacted by the spring. These minimum size requirements present obstacles to miniaturization of the tensioner.

BRIEF SUMMARY OF THE INVENTION

An object of the invention is to provide a ratchet tensioner in which the loss and buckling of the ratchet-biasing spring are prevented, so that the tensioner can operate reliably for an extended period of time.

The ratchet tensioner according to the invention comprises a housing having a plunger-accommodating hole and a plunger slidable in the plunger-accommodating hole, and protruding therefrom. A biasing spring urges the plunger in the protruding direction. A rack of ratchet teeth, formed on the plunger, extends in the direction of protrusion of the plunger, and a pawl, pivoted on the housing, is positioned to engage and disengage the teeth of the rack. The pawl and rack form a ratchet mechanism which allows protruding movement of the plunger, while limiting retracting movement of the plunger to a distance corresponding to the backlash of the ratchet mechanism. A pawl-biasing spring, in compression between the housing and the pawl, urges the pawl into engagement with the rack. A part of the pawl-biasing spring is disposed in a spring-accommodating hole in the housing, and a piston is disposed between the pawl-biasing spring and the pawl. A part of the piston is located within, and slidable in, the spring-accommodating hole, and a part of the piston, located outside he spring-accommodating hole, is in contact with the pawl.

Preferably, the piston has a flat surface engageable with a portion of the pawl, and the portion of the pawl engageable by the flat surface of the piston is a convexly curved surface.

In a preferred embodiment, at least a part of the piston extending from the pawl toward the spring-accommodating hole has a maximum dimension less than the maximum dimension of the part of the piston slidable in the spring-accommodating hole, said dimensions being measured in directions perpendicular to the direction of piston movement. The part of the piston that is slidable in the spring-accommodating hole is preferably in the form of a circular cylinder, and the reduced part of the piston, extending from the pawl toward the spring-accommodating hole is also preferably in the form of a circular cylinder, having a diameter less than the diameter of the slidable part.

The presence of the piston slidable in the spring-accommodating hole in the tensioner housing ensures that the pawl biasing spring operates without being exposed outside the hole. Consequently, the pawl-biasing spring cannot buckle or drop out of the spring-accommodating hole, and can exert a pivoting force on the pawl smoothly over a long period of time. In addition, the reduction of the size of the end of the piston that contacts the pawl makes it possible to miniaturize the tensioner by making the portion of the pawl on the side of the pawl pivoting shaft opposite from the pawl teeth shorter, while avoiding excessive reduction in the radial dimensions of the portion of the pawl surrounding the pivoting shaft.

Furthermore, when the front of the piston is flat, and the part of the pawl that is contacted by the piston has a convexly curved surface, the force exerted by the pawl on the piston is always oriented along the direction of the center line of the pawl-biasing spring. The avoidance of transverse force components ensures smooth and reliable operation of the ratchet mechanism as the pawl is rotated by protruding and retracting movement of the plunger during operation of the tensioner.

DETAILED DESCRIPTION OF THE PREFERRED EMBODIMENTS

Figure 1:
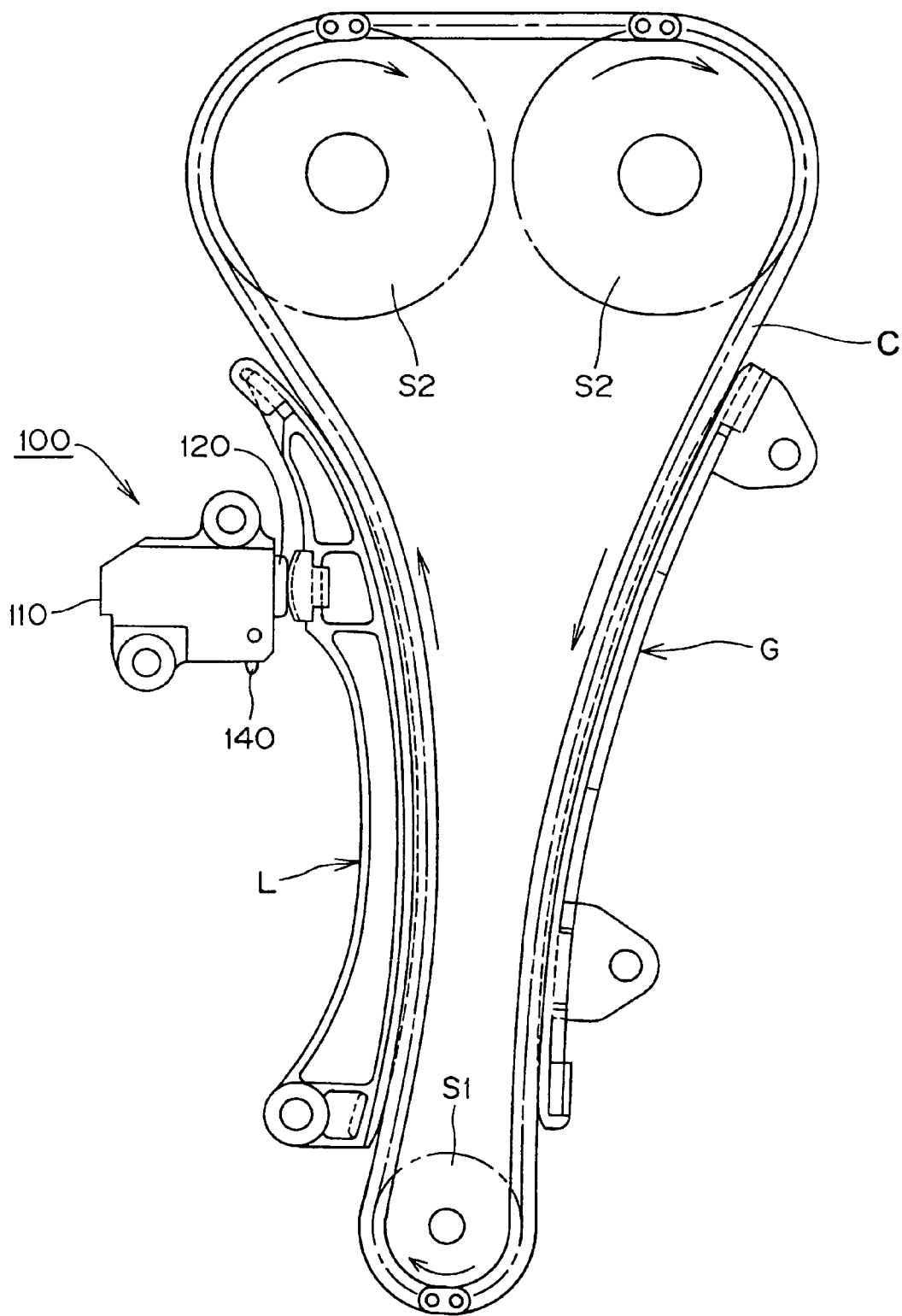
FIG. 1 is a schematic elevational view of the timing drive of a typical double overhead cam internal combustion engine equipped with a ratchet tensioner in accordance with the invention.

As shown in FIG. 1, the ratchet tensioner 100, in accordance with the invention, is mounted adjacent the slack side of a timing chain C, which transmits rotation from a crankshaft sprocket S1 to a pair of camshaft sprockets S2. The plunger 120 of the tensioner is slidable in the tensioner housing 110, and protrudes therefrom, pressing against the back of a pivoted lever L at a location spaced from the lever's pivot axis. The lever L includes a sliding contact shoe, on which the slack side of the chain slides. A fixed guide G, guides the tension side of the timing chain C. The tensioner, the lever L, and the guide G may all be mounted on the engine block (not shown). Arrows indicate the direction of rotation of the sprockets, and the direction of movement of the chain C.

Figure 2:
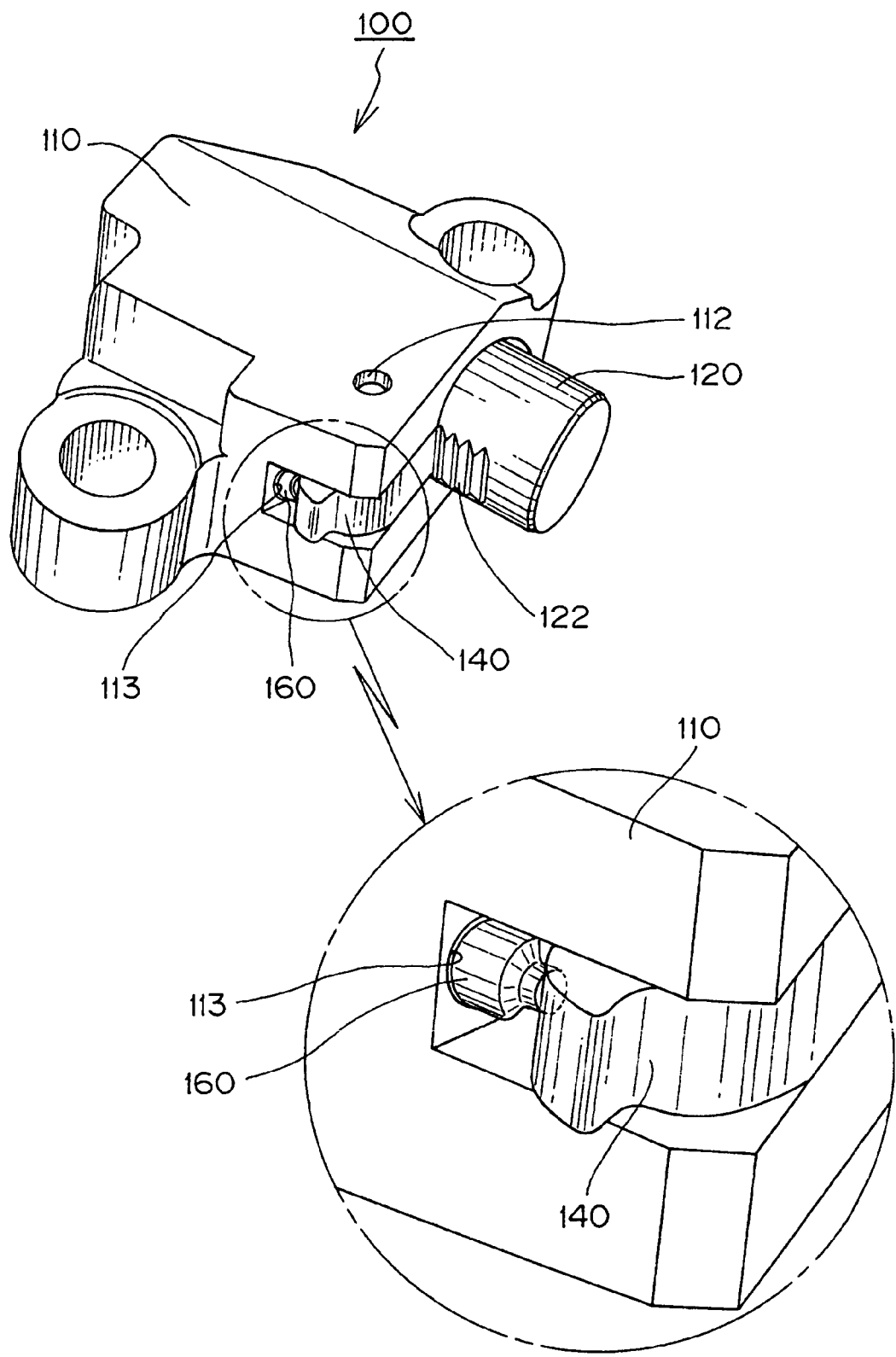
FIG. 2 is a perspective view of the tensioner, including an enlargement of a portion of the ratchet pawl and a part of the piston pressed against the pawl by the pawl-biasing spring.
Figure 3:
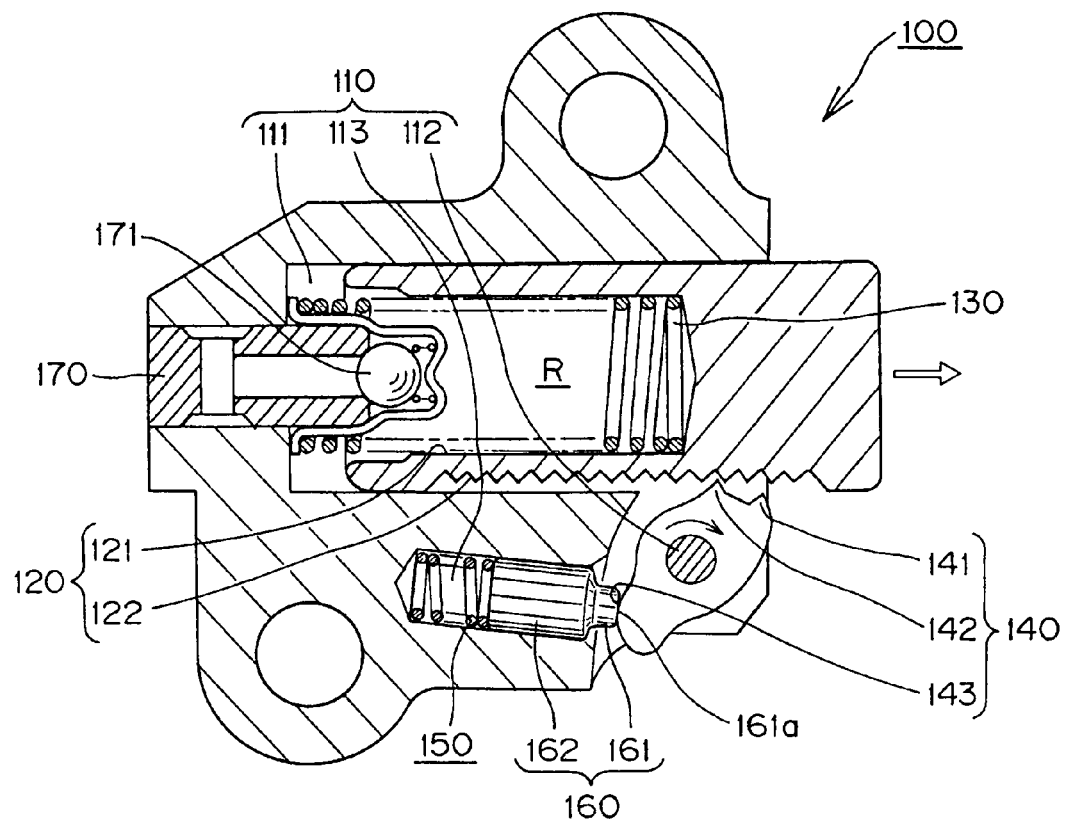
FIG. 3 is a cross-sectional view of the tensioner, showing the ratchet pawl rotated to a position in which it allows protruding movement of the plunger.
Figure 4:
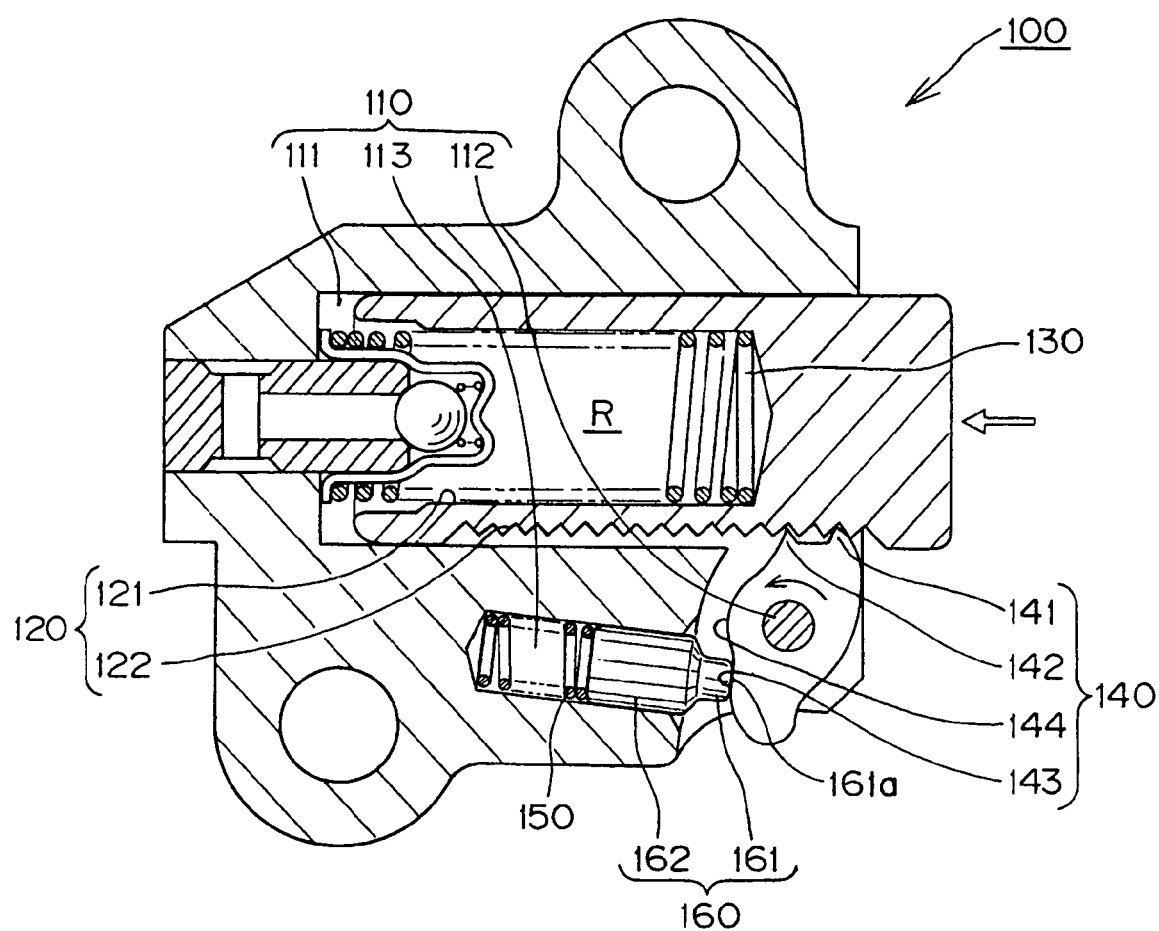
FIG. 4 is a cross-sectional view of the tensioner, showing the ratchet pawl rotated to a position in which it blocks retracting movement of the plunger.
Figure 5:
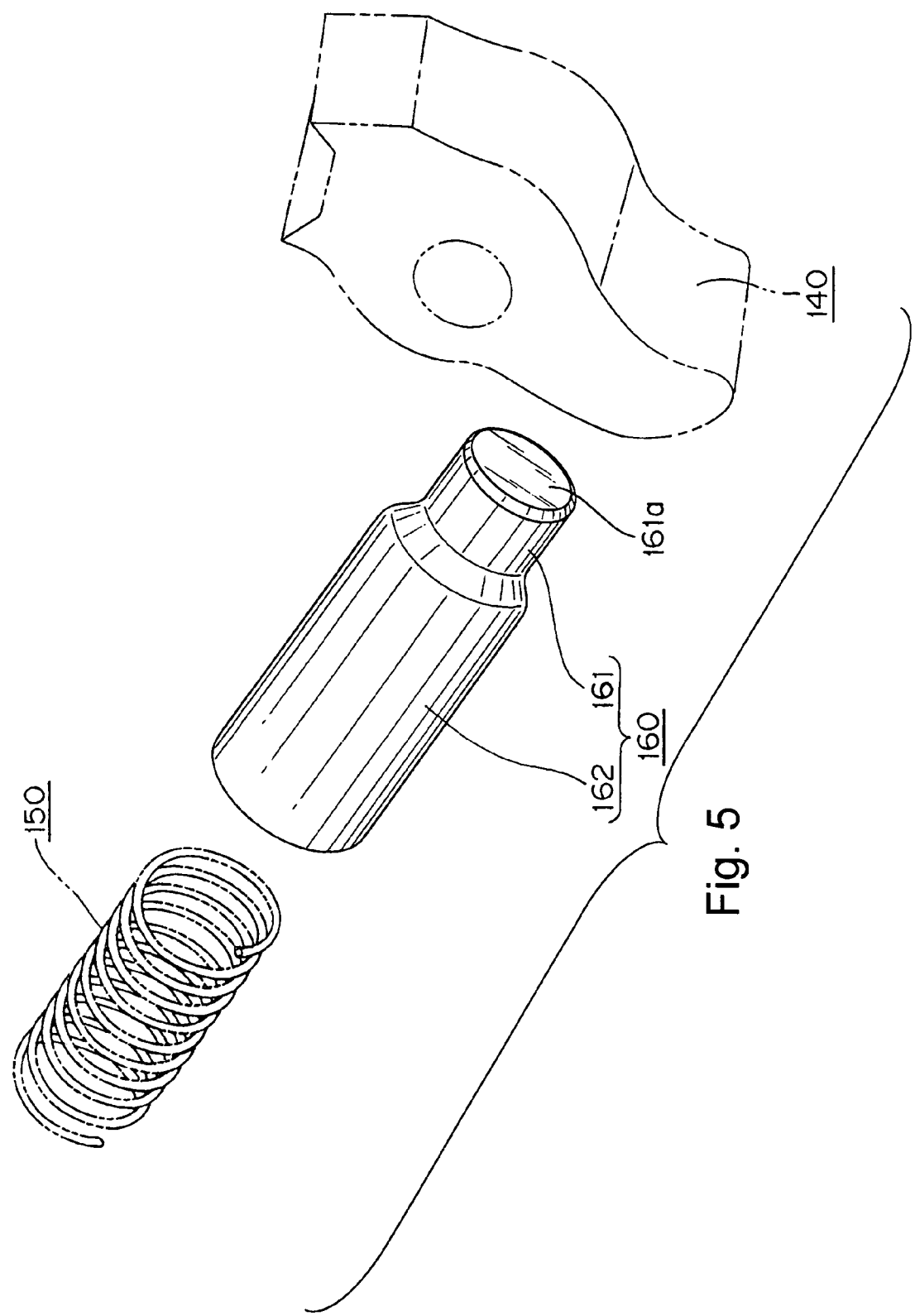
FIG. 5 is an exploded perspective view showing the pawl, the piston, and the pawl-biasing spring.
Figure 6:
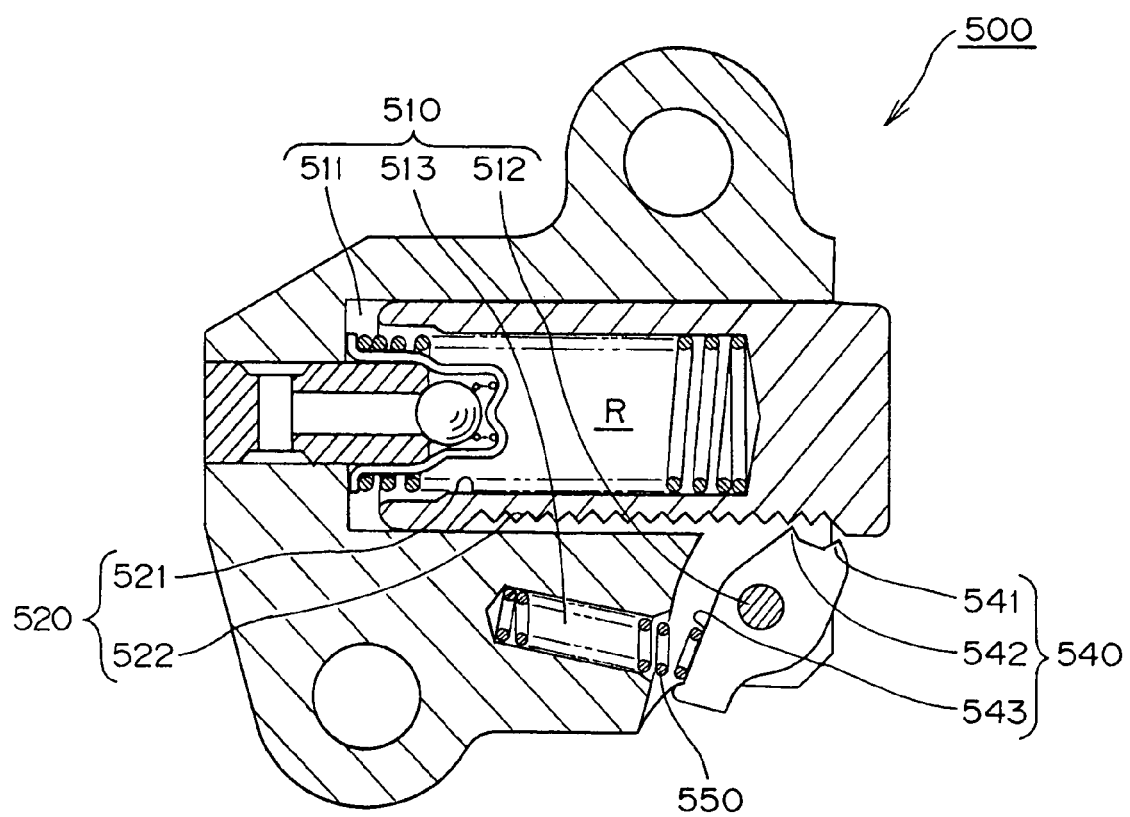
FIG. 6 is a cross-sectional view of a conventional ratchet type tensioner.
Figure 7:
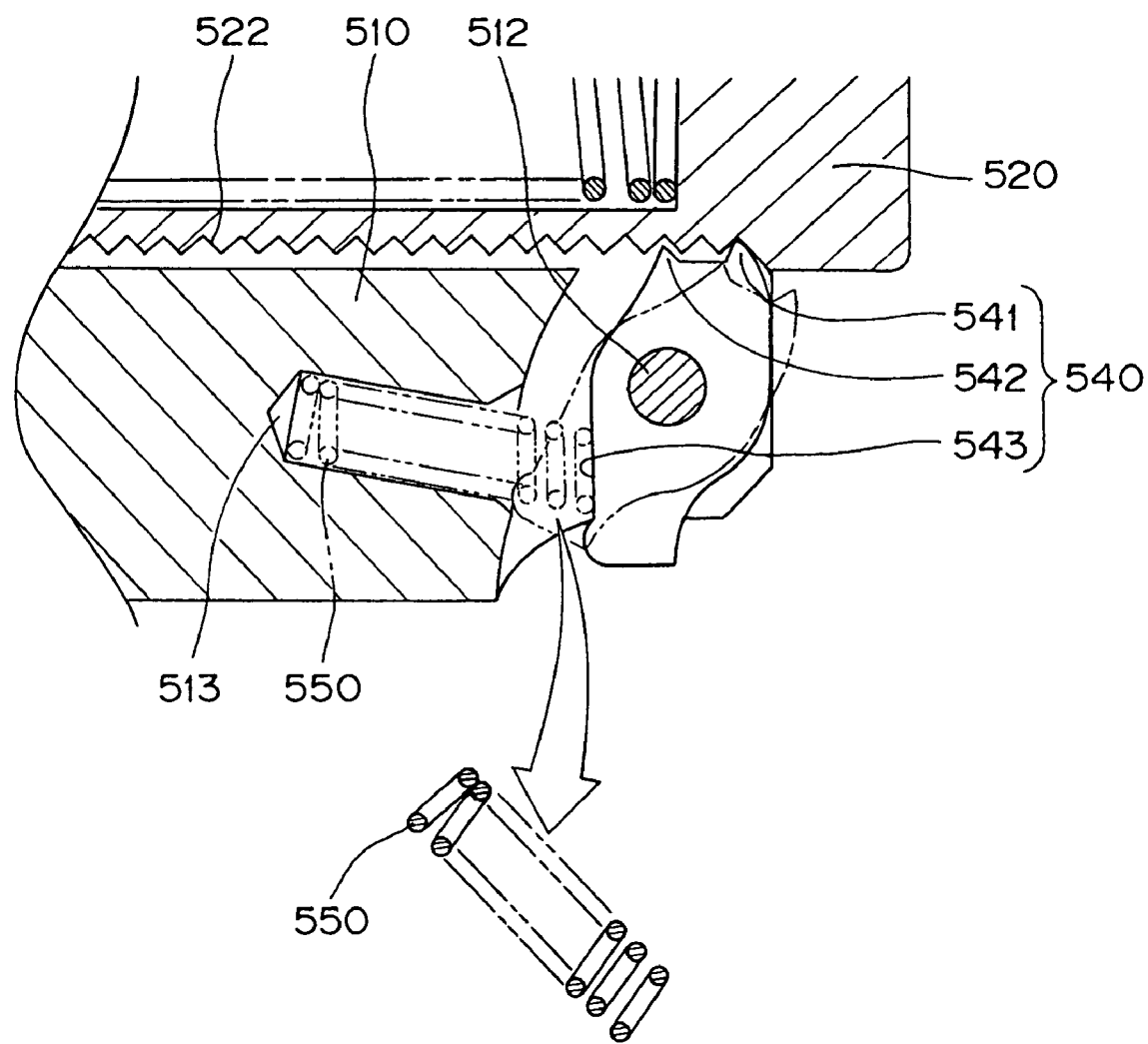
FIG. 7 is an cross-sectional view showing a pawl-biasing spring dropping off a conventional tensioner of the ratchet biasing spring.
Figure 8:
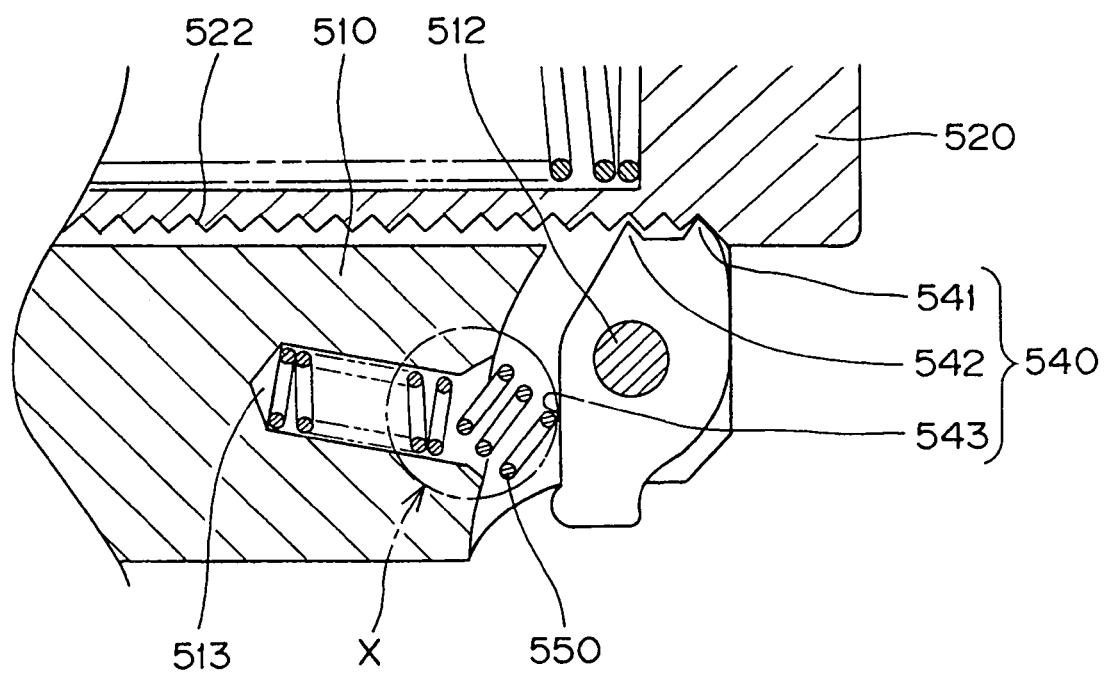
FIG. 8 is an cross-sectional view showing the buckling of a pawl-biasing spring in a conventional tensioner.

As shown in FIGS. 2, 3 and 4, the plunger 120 fits slidably in a plunger-accommodating hole 111 in the tensioner housing 110. The plunger is hollow, having a blind bore 121, with an opening facing the bottom of the plunger-accommodating hole. One end of a plunger-biasing spring 130 engages the bottom of the plunger-accommodating hole 111, and the spring is in compression, extending into the interior of the plunger and pressing against the bottom of the blind bore of the plunger, thereby continuously urging the plunger in the protruding direction.

A ratchet mechanism, which allows forward displacement of the plunger 120 but limits backward displacement, includes a ratchet pawl 140, which is pivoted on a shaft 112 provided in the housing 110. The pawl is engaged by a piston 160, which is, in turn, biased against the pawl by a biasing spring 150, so that the pawl is urged counterclockwise (as viewed in FIGS. 3 and 4), and its teeth 141 and 142 are urged into engagement with the teeth of a rack 122 formed on the on a side of the plunger 120, and extending parallel to the direction of sliding movement of the plunger. The ratchet mechanism allows forward displacement of the plunger, as depicted in FIG. 3, and a limited amount of retraction, as depicted in FIG. 4. Retraction of the plunger is limited to a distance corresponding to the backlash of the ratchet mechanism.

The pawl-biasing spring 150 is disposed in a spring-accommodating hole 113, the diameter of which is slightly greater than that of the spring so that the spring cannot buckle within the hole.

As shown in FIGS. 3 and 4, the piston-facing part 143 of the pawl 140 has a convex curvature. The radial dimension of portion 144 of the pawl, i.e., the portion surrounding the shaft 112 on which the pawl is pivoted, is relatively large. Consequently, the thickness of the wall surrounding the hole that receives shaft 112 is sufficient to avoid cracking and failure of the pawl.

Oil is introduced into the tensioner under pressure from an external oil supply. The oil is received in a high-pressure chamber R formed by the plunger-accommodating hole 111 and the blind bore 121 of the plunger. The oil is introduced through a check valve unit 170 having a check ball 171. The oil is introduced through the check valve unit as the plunger moves in the protruding direction, as shown in FIG. 3, protrusion being permitted by the ratchet mechanism. When the plunger 120 receives an impact through the tensioner lever L, as shown in FIG. 4, the plunger 120 moves in the retracting direction against the biasing force of the plunger-biasing spring 130 within the amount of backlash permitted by the teeth of rack 122 and the teeth 141 and 142 of the pawl. When the plunger moves in the retracting direction, the ball 171 of the check valve engages its seat, blocking reverse flow of oil back toward the oil supply, and causing oil to leak through the small clearance between the plunger and the wall of the plunger-accommodating hole 111. As a result, the impact force applied to the plunger from the timing chain C is absorbed, and vibration of the timing chain C is damped.

As shown in FIG. 4, the piston 160 is a metal piston, protruding from the spring-accommodating hole 113, and urged by the pawl-biasing spring 150 against the pawl 140. The piston 160 comprises a cylindrical portion 162, which is slidable in the spring-accommodating hole 113, and a front portion 161, extending from the cylindrical portion to the pawl. The maximum dimension of the front portion 161, in directions perpendicular to the direction of movement of the piston, is less than the diameter of the cylindrical portion 162. The front portion of the piston contacts the piston-facing part 143 of the pawl, without contacting portion 144 of the pawl in the vicinity of the hole which receives shaft 112. Preferably, the pawl-contacting face 161a of the front portion 161 of the piston is a flat surface. The piston-facing part 143 of the pawl, however, has a convex curvature in planes to which the axis of the pawl pivoting shaft is perpendicular.

The length of the piston 160 is selected so that the piston cannot drop out of the spring-accommodating hole 113. Thus, the overall length of the piston should be greater than the maximum length of the space between the opening of the spring-accommodating hole 113 and the pawl 140.

Although, in the embodiment illustrated in FIGS. 3 and 4, the piston 160 has a reduced portion 161 formed only on one end of the piston, it is possible to form the piston with reduced portions, corresponding to portion 161, at both of its ends. In this way, in the assembly of the tensioner, the piston can be inserted into the spring-accommodating hole without regard to the direction of the pawl-contacting portion, thereby avoiding erroneous assembly.

As shown in FIG. 3, when the timing chain C loosens, the plunger is displaced by the plunger-biasing spring 130 in the protruding direction. The teeth of rack 122 on the plunger press against pawl teeth 141 and 142, and the pawl 140 is rotated clockwise about the shaft 112, causing the piston 160 to compress spring 150. If the protruding displacement of the plunger is sufficiently large, the pawl teeth 141 and 142 pass over teeth of the rack 122, and come into engagement with different teeth on the rack as the pawl rotates counterclockwise. Then, when the timing chain tightens, the plunger can retract by a distance corresponding to the backlash of the ratchet mechanism, with the teeth of the pawl remaining engaged with the above-mentioned different teeth of the rack. In this way, as the chain lengthens over time, the plunger of the tensioner gradually steps forward, maintaining the tension of the chain within a limited range.

When the pawl 140 rotates counterclockwise, spring 150 expands, maintaining piston 160 in engagement with part 143 of the pawl 140. The above-described actions can repeat until the timing chain C is no longer loose.

The piston 160 is maintained in sliding relationship with the spring-accommodating hole 113. Therefore dropping off of the pawl-biasing spring 150 during mounted of the tensioner is avoided and mounting of the tensioner is facilitated. Furthermore, since the pawl-biasing spring 150 is maintained within hole 113, buckling of the spring 150 during operation of the tensioner is avoided, and the pawl can pivot smoothly, ensuring reliable operation of the tensioner for a long time.

Since the piston 160 includes a body portion 162, which slides in the spring-accommodating hole 113, and the front portion 161 has a smaller diameter than the piston body portion 162, contact between the piston and portion 144 of the pawl, in the vicinity of the pawl pivoting shaft, is avoided, and the piston instead contacts the convexly curved portion 143 of the pawl. Consequently, the portion of the pawl surrounding the shaft 112 can be in the form of a radially thick wall, and miniaturization of the pawl 140 can be realized without reduction of portion 144 to the extent that it becomes subject to cracking.

Since the front end 161a of the piston 160 is flat and the piston-facing portion 143 of the pawl 140 is convexly curved, the drag on the piston is maintained along the central axis of the piston regardless of the inclination of the pawl 140. Consequently, the pawl 140 pivots smoothly and the ratchet mechanism functions smoothly.

Finally, the length of the piston 160 can be selected easily, making it possible to use an easily procured spring as the pawl-biasing spring 150. Moreover, since no transverse load is applied to the spring 150, buckling of the spring is avoided, and its useful life can be improved.

Various modifications can be made to the tensioner in accordance with the invention. The invention is applicable to a variety of ratchet tensioners, including, both hydraulic tensioners and ratchet tensioners which do not include a hydraulic mechanism. The invention is also applicable to hydraulic tensioners including a release valve mechanism. Furthermore, the pawl, the pawl-biasing spring, and the piston can be disposed at any suitable position along the range of movement of the plunger, and may be farther forward than the pawl, spring and piston depicted in FIGS. 2-4. The pawl-biasing spring and the piston can also be arranged so that the piston moves in a direction parallel to the direction of movement of the plunger. In this arrangement, the axis of the plunger-accommodating hole and the axis of the spring-accommodating hole are parallel, and both holes can be formed simultaneously, which is desirable to facilitate production of the tensioner housing. Finally, since the piston intervenes between the pawl-biasing spring and the pawl, the spring can be of any suitable size and shape, irrespective of the size of the pawl.

What is claimed is:

1. A ratchet tensioner comprising:
   a housing having a plunger-accommodating hole;
   a plunger slidable in the plunger-accommodating hole, and protruding therefrom in a protruding direction;
   a biasing spring urging the plunger in the protruding direction;
   a rack of ratchet teeth formed on the plunger and extending in said protruding direction;
   a pawl pivoted on the housing, and positioned to engage and disengage the rack, the pawl and the rack forming a ratchet mechanism having backlash, the ratchet mechanism allowing protruding movement of the plunger while limiting retracting movement of the plunger to a distance corresponding to the backlash of the ratchet mechanism;
   a pawl-biasing spring in compression between the housing and the pawl, the pawl-biasing spring urging the pawl into engagement with the rack, the pawl-biasing spring being disposed in a spring-accommodating hole in the housing; and
   a piston, disposed between the pawl-biasing spring and the pawl, a part of the piston being located within, and slidable in, the spring-accommodating hole, and a part of the piston, located outside the spring-accommodating hole, being in contact with the pawl;
   in which at least a part of the piston extending from the pawl toward the spring-accommodating hole has a maximum dimension less than the maximum dimension of the part of the piston slidable in the spring-accommodating hole, said dimensions being measured in directions perpendicular to the direction of piston movement.

2. A ratchet tensioner according to claim 1, in which the piston has a flat surface engageable with a portion of the pawl, and in which the portion of the pawl engageable by the flat surface of the piston is a convexly curved surface.

* * * * *